UNITED STATES PATENT OFFICE.

WHITNEY B. JONES, OF PERTH AMBOY, NEW JERSEY, ASSIGNOR TO GENERAL BAKELITE COMPANY, OF NEW YORK, N. Y., A CORPORATION OF NEW YORK.

COATING COMPOSITION.

1,200,731.  Specification of Letters Patent.  Patented Oct. 10, 1916.

No Drawing.  Application filed November 5, 1913. Serial No. 799,385.

*To all whom it may concern:*

Be it known that I, WHITNEY B. JONES, a citizen of the United States, residing at Perth Amboy, in the county of Middlesex and State of New Jersey, have invented certain new and useful Improvements in Coating Compositions, of which the following is a specification.

This invention relates to varnishes or paints containing phenolic condensation products, in conjunction with a solvent containing anilin or suitable homologues thereof, and preferably also certain cyclic hydrocarbons as toluene or xylene. The phenolic condensation products preferably used are such as are capable of transformation by simple heating into an infusible product.

A preferred varnish in accordance with the present invention comprises 1400 parts by weight of a suitable liquid or pasty condensation product of phenols and formaldehyde, 750 parts of anilin, and 850 parts of xylene. These proportions may be varied as desired.

The phenolic condensation product referred to is preferably prepared from pure or commercial grades of phenol or cresol, or mixtures thereof, in presence of a basic condensing-agent, and it may be made as described in U. S. Patent 954,666, patented April 12, 1910, to L. H. Baekeland, or in any other approved or known manner, the reaction being however preferably carried, at this stage of the process, only to the formation of liquid or pasty condensation products, which are however transformable by sufficient heating into infusible products.

The anilin used may be of ordinary commercial grade, containing in variable proportions toluidin, xylidin and the like. The presence of such homologues of anilin is sometimes advantageous as rendering the composition more slow-drying, or imparting to it special spreading or penetrating qualities, and I may add them in such proportions as may be desired for particular uses.

Among the suitable cyclic hydrocarbons, commercial grades of xylene or products containing xylene in preponderating quantity are preferred for most purposes. Xylene not only cheapens the product, but appears to increase the rate of drying.

Varnishes prepared as above are clear solutions having excellent spreading qualities under the brush, being in this respect far superior to alcoholic or similar solutions of these condensation products. They dry with sufficient rapidity, and when applied to wood or other porous materials they penetrate to a degree sufficient to secure close adherence of the film, their advantage in this respect over alcoholic solutions being strongly marked. Such varnishes are used with advantage as vehicles for pigments in the preparation of paints. An illustrative composition for a paint is as follows:—

| | | | |
|---|---|---|---|
| American vermilion | 250 | parts by weight |
| Fine asbestos | 20 | " | " | " |
| Powdered silica | 50 | " | " | " |
| Anilin varnish above described | 400 | " | " | " |
| Liquid or pasty phenolic condensation product | 50 | " | " | " |

The mixture may be ground in a paint mill in the usual way, and dries to a hard, tough film in four to five hours under normal conditions.

The American vermilion, which is a variety of lead chromate, retains in this composition its known inhibitive powers, preventing the rusting of iron or steel. It may be replaced wholly or in part by other rust-inhibiting materials or pigments, as other chromates of lead, chromate of zinc, powdered micaceous specular hematite, or the like.

Whether applied as a clear varnish or as a paint, the film may when the character of the work permits, be subjected to baking at 120–125° C., or at other suitable temperatures, for a sufficient time, say four to five hours. Under these conditions, the phenolic condensation product undergoes polymerization in the known manner, and the film is rendered very hard and highly resistant to solvents and heat.

The composition as herein described, and particularly the paints containing a rust-inhibiting component, are especially adapted for use as a first coating for steel railroad cars or their parts, or for analogus purposes. Thus applied, they form a substratum over which any desired decorative paint may be applied. It is preferred in such cases, whenever practicable, to bake or heat this priming coat. Whether baked or not, the coat presents special advantages, in that it provides a complete protection of the metal by an impervious, highly inhibitive and non-hydrolyzing enamel in immediate contact therewith, over which may be applied any desired number of coats of ordinary drying-oil paints, or of other finish having a decorative function. Such finishes not only adhere with unusual tenacity to the protective substratum, but it is rendered practicable to use for the finish the cheaper varieties of decorative paints, for the reason that they need not be depended upon for a protective effect on the metal. A further advantage of the anilin-containing compositions is that their odor is relatively slight and unobjectionable, as compared with that of alcoholic solutions of the same condensation products, and particularly of such condensation products as contain material proportions of uncombined cresol.

Instead of using a liquid or pasty variety of the initial phenolic condensation product, I may employ the known solid varieties thereof; but I prefer the former, as I have found that varnishes and paints prepared from them give better technical effects, dry flat, and allow of longer and smoother brushing. As is known, these liquid or pasty condensation products usually contain some free phenol or cresol, which renders them more readily or freely soluble in the solvent used.

My invention is not restricted to the proportions or to the joint use of all of the components included in the illustrative examples above given; nor is it restricted to the described method of compounding the paint or varnish. For example, the anilin may be incorporated with the phenol and formaldehyde, or their equivalents, at any stage of the process, for example during or before the condensation. For instance, the condensation whereby the initial, soluble phenolic condensation product is formed may be carried out in presence of a portion of the total quantity of anilin, the remainder, together with the cyclic hydrocarbon if used, being added as a diluent; or the process may be otherwise modified as desired.

I claim:—

1. A fluid coating composition containing a phenolic condensation product transformable by heat into an infusible body, and a solvent therefor containing anilin.

2. A fluid coating composition containing a phenolic condensation product transformable by heat into an infusible body, and a solvent therefor containing anilin, the proportion of anilin being at least equal to that of the condensation product.

3. A fluid coating composition containing a phenolic condensation product transformable by heat into an infusible body, and a solvent therefor containing anilin and a cyclic hydrocarbon.

4. A fluid coating composition containing a phenolic condensation product transformable by heat into an infusible body, and a solvent therefor containing anilin and a cyclic hydrocarbon, the proportion of anilin being at least equal to that of the condensation product.

5. A fluid coating composition containing a phenolic condensation product transformable by heat into an infusible body, and a solvent therefor containing anilin and xylene.

6. A fluid coating composition containing a phenolic condensation product transformable by heat into an infusible body, and a solvent therefor containing anilin and xylene, the proportion of anilin being at least equal to that of the condensation product.

7. A fluid coating composition containing a phenolic condensation product transformable by heat into an infusible body, anilin, a cyclic hydrocarbon, and a rust-inhibiting pigment.

8. A fluid coating composition containing a phenolic condensation product transformable by heat into an infusible body, anilin, xylene, and a rust-inhibiting pigment.

9. A fluid coating composition containing a phenolic condensation product transformable by heat into an infusible body, a solvent therefor containing anilin, and a rust-inhibiting pigment.

In testimony whereof I affix my signature.

WHITNEY B. JONES.